(12) United States Patent
Hewitt

(10) Patent No.: US 7,658,104 B2
(45) Date of Patent: *Feb. 9, 2010

(54) LIQUID LEVEL SENSOR WITH LEVEL ALARM

(76) Inventor: John T. Hewitt, 5492 Boles Ave., Huntington Beach, CA (US) 92649

( * ) Notice: Subject to any disclaimer, the term of this patent is extended or adjusted under 35 U.S.C. 154(b) by 0 days.

This patent is subject to a terminal disclaimer.

(21) Appl. No.: 12/143,687

(22) Filed: Jun. 20, 2008

(65) Prior Publication Data
US 2008/0271527 A1    Nov. 6, 2008

Related U.S. Application Data (63) Continuation-in-part of application No. 11/951,865, filed on Dec. 6, 2007, which is a continuation-in-part of application No. 11/743,111, filed on May 1, 2007.

(51) Int. Cl.
G01F 23/00    (2006.01)
(52) U.S. Cl. .......................... 73/290 R; 73/299
(58) Field of Classification Search .............. 73/299; 200/83 C
See application file for complete search history.

(56) References Cited

U.S. PATENT DOCUMENTS

| | | | |
|---|---|---|---|
| 1,391,077 A | | 9/1921 | Richter |
| 1,508,969 A | | 9/1924 | Guichard |
| 1,657,794 A | * | 1/1928 | Elton et al. ............... 200/83 C |
| 1,661,995 A | | 3/1928 | Brown |
| 1,946,175 A | | 2/1934 | Murphy et al. |
| 2,382,695 A | | 8/1945 | De Giers |
| 2,455,200 A | * | 11/1948 | Wallace ........................ 73/299 |
| 2,989,870 A | | 6/1961 | Stahl |
| 3,290,939 A | | 12/1966 | Beck et al. |
| 3,664,365 A | | 5/1972 | Ralet et al. |
| 3,688,577 A | | 9/1972 | Murphy, Jr. et al. |
| 3,782,323 A | | 1/1974 | Jones |
| 3,956,937 A | | 5/1976 | Lawford et al. |

(Continued)

FOREIGN PATENT DOCUMENTS

EP         0045011         2/1982

(Continued)

OTHER PUBLICATIONS

Notification of Transmittal of the International Search Report and the Written Opinion of the International Searching Authority, or the Declaration—Jun. 18, 2008—PCT/US2008/002767.

(Continued)

Primary Examiner—Hezron Williams
Assistant Examiner—Mark Shabman
(74) Attorney, Agent, or Firm—Larry K. Roberts (57) ABSTRACT

A liquid level sensor system actuated by a column pressure includes a hollow member having a distal open end adapted to be positioned into a liquid reservoir to a depth below a liquid surface level, and a sensor head unit. The sensor head unit is responsive to the column pressure to provide an indication of a liquid level in the reservoir. A low liquid level alarm circuit is responsive to the bellows member to generate a signal indicative of a low liquid level state.

22 Claims, 9 Drawing Sheets

U.S. PATENT DOCUMENTS

| | | |
|---|---|---|
| 4,111,044 A | 9/1978 | McClure |
| 4,289,027 A | 9/1981 | Gleaves et al. |
| 4,417,232 A | 11/1983 | Tewfik |
| 4,504,819 A | 3/1985 | Hosoya |
| 4,541,285 A | 9/1985 | Hafner |
| 4,549,164 A | 10/1985 | Tewfik |
| 4,735,100 A | 4/1988 | Hajto |
| 4,995,357 A | 2/1991 | Gonnering et al. |
| 6,040,776 A | 3/2000 | Glover et al. |
| 6,703,635 B2 | 3/2004 | Yashiro et al. |
| 2006/0053879 A1 | 3/2006 | Reinis et al. |

FOREIGN PATENT DOCUMENTS

| | | |
|---|---|---|
| EP | 1413443 | 4/2004 |
| GB | 556268 | 9/1943 |
| GB | 2011077 | 7/1979 |

OTHER PUBLICATIONS

Office Action mailed Apr. 25, 2008 in connection with U.S. Appl. No. 11/743,111.

Notification re Transmittal of International Search Report and Written Opinion of ISA; PCT/US2009/047841; mailed Jul. 30, 2009.

* cited by examiner

FIG. 14 imate size feature sizes may be exaggerated for illustrative purposes.

LIQUID LEVEL SENSOR WITH LEVEL ALARM

CROSS-REFERENCE TO RELATED APPLICATION

This application is a continuation-in-part of application Ser. No. 11/951,865, filed Dec. 6, 2007, which in turn is a continuation-in-part of application Ser. No. 11/743,111, filed May 1, 2007, the entire contents of which applications are incorporated herein by this reference.

BACKGROUND

Determining or estimating the level of a liquid in a reservoir can be difficult, and subject to error. Conventional arrangements include fuel tank sensors which utilize a float device which floats on a liquid surface, a measuring stick which is inserted into a tank to contact its bottom and then removed for observation of a liquid level on the stick, or even a sight glass.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals. The figures are not to scale, and relative feature sizes may be exaggerated for illustrative purposes.

An exemplary embodiment of a non-electrically powered liquid level sensor system 50 is depicted in FIGS. 1-5. The system 50 may be used to sense and provide an indication of the level 14 of a liquid 12 in a reservoir or tank 10. In one exemplary embodiment, the liquid 12 may be lubricating oil in a crankcase. The system may be used to sense the level of other liquids in a tank or reservoir, including, by way of example only, water, gasoline or other liquid fuel in a fuel tank of a vehicle or airplane, gasoline in an underground storage tank at a fuel station.

In the exemplary embodiment of FIGS. 1-5, the system 50 includes a hollow sensing tube 60 which is inserted into the reservoir 10. The tube has a distal open end 62 which is positioned at a depth in the reservoir at or below the lowest level to be sensed by the system 50. The open end 62 of the tube allows liquid to enter the tube to an equilibrium level 16 which is determined by the volume of liquid in the reservoir 10, and characteristics of the system 50. Entry of the liquid into the tube end 62 creates a column air pressure within the tube chamber 66. In an exemplary embodiment, the column air pressure is variable as the level 14 of the liquid varies. The higher the level 14, the higher will be the corresponding level 16 of liquid within the tube and the resulting column pressure. Conversely, as the level 14 decreases, the level 16 within the tube also decreases, as well as the corresponding column pressure. In an exemplary embodiment, the sensing tube 60 has a cylindrical chamber configuration, with an inner diameter of ⅝ inch, although other sizes and shapes can alternatively be employed.

The system 50 includes a means responsive to the changes in column pressure to provide an indication of the level 14 of the liquid 12 within the reservoir 10. In an exemplary embodiment, the means may be provided by a head unit 100, which includes a bellows 120 having an input stem 122, a bellows expansion body portion 124, and a distal bellows face surface 126. The bellows thus provides a chamber whose volume varies with the pressure applied to the input stem 122. The only opening to the bellows chamber is provided by the input stem. The input stem is coupled to the tube 60 by a connection tube system 70 which may run from a connector end 64 of the tube 60 to the head unit 100. The length of the connection tube system may vary, depending on the requirements of a given application. In an exemplary embodiment, the connection tubing system includes a flexible tubing section fabricated of an air-impermeable plastic material. In an exemplary embodiment, the tubing section may be a length of tubing marketed as Weatherhead 4 mm MTP16004NA-100, although other tubing sections of different dimensions may alternatively be employed. The tubing system may include push-together plastic tubing connectors, in which an end of a plastic tubing section is inserted into the connector and engages in an air-tight seal, e.g. with an o-ring included in the connector.

The bellows 120 in an exemplary embodiment is fabricated of a metal such as bronze, and has a "memory" tending to return the face surface 126 to a home position in the absence of a positive or negative relative pressure in the bellows body portion, i.e. relative to ambient atmospheric pressure. The position of the bellows face surface 126 is movable linearly along axis 128 in response to changes in the column pressure in the tube 60. The input stem 126 may be a rigid tubular portion, having exterior threads formed on the exterior surface to facilitate airtight coupling to the connector tubing structure 70. In an exemplary embodiment, the bellows 120 may be adapted to provide a linear travel range of 0.050 inch over a column pressure range between a column pressure associated with a reservoir "empty" condition and a column pressure associate with a reservoir "full" condition. This linear travel range may vary depending on other parameters of the liquid level sensor system.

In an exemplary embodiment, the head 100 further provides a mechanism to convert the linear movement of the bellows face surface 126 into a rotary movement. This may provide a rotary dial readout function indicating the level of liquid in the reservoir. In an exemplary embodiment, the linear-to-rotary movement conversion may be provided by a sector gear movement 140, discussed more fully below. In an exemplary embodiment, the head 100 includes a dial plate 110 and a dial face 110A having indicia noted thereon indicative of a range of liquid levels, e.g. ranging from "E" or empty to "F" or full. A dial indicator pointer 112 (FIG. 2) rotates on a rotatable hub 142 supported in the sector gear movement.

It will be appreciated that the head 100 may be mounted at a suitable location, which may be remote from the reservoir 10. The mounting location may be an instrument dashboard in a vehicle, boat, ship or airplane, for example. Or it could be mounted at a convenient monitoring location in a service station, in the case in which the reservoir is a fuel reservoir.

Figure 3:
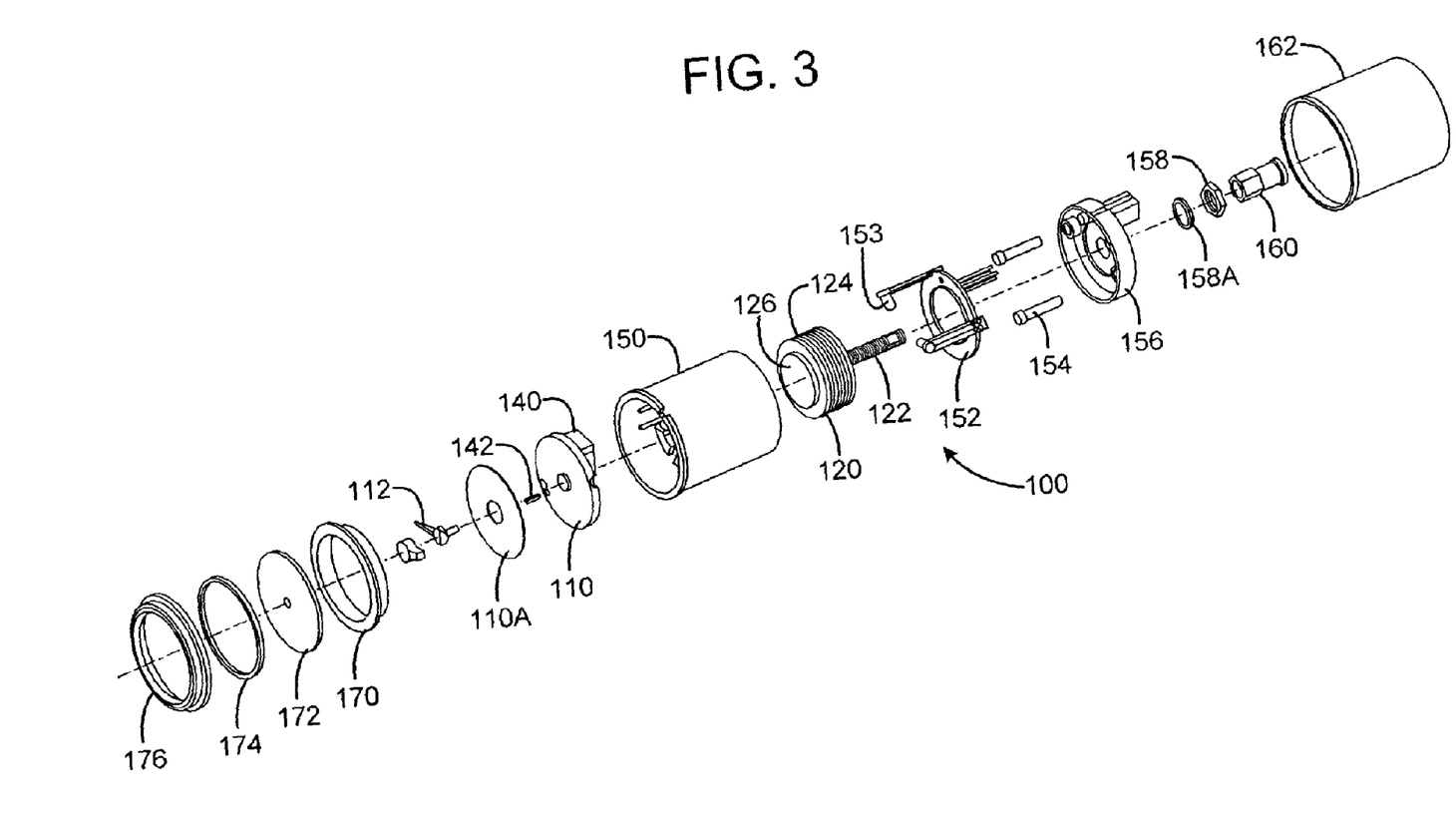
FIG. 3 is an exploded isometric view of an exemplary embodiment of a sensor head component for the liquid level sensor of FIG. 1.
Figure 4:
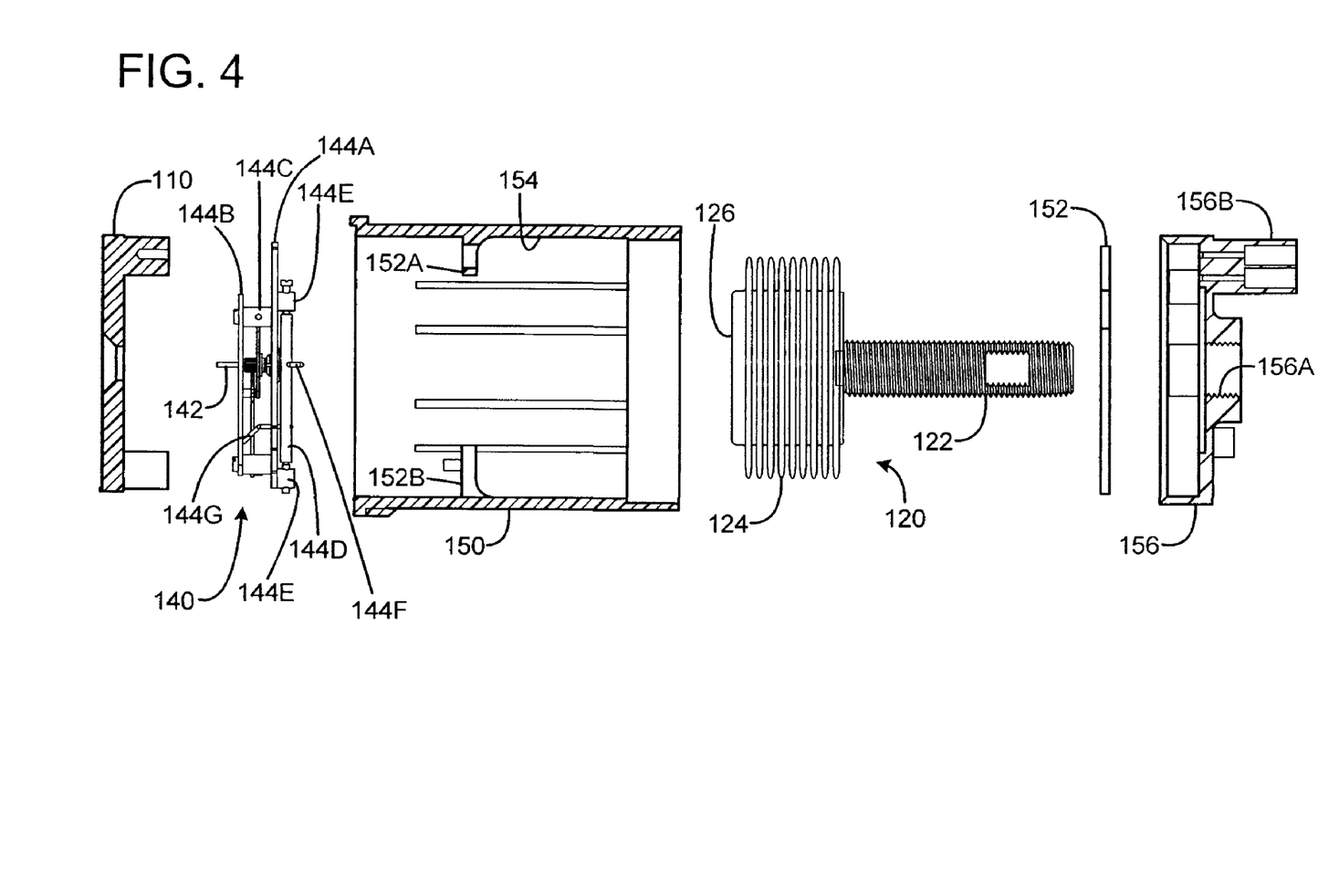
FIG. 4 is an exploded side view of components of an exemplary embodiment of a sensor head assembly for a liquid level sensor.

FIGS. 3 and 4 are exploded views of components of an exemplary embodiment of a sensor head unit 100. The head assembly includes a housing 150, of a generally cylindrical outer configuration, which supports the sector gear movement 140. The dial plate 110 is carried by the sector gear movement, and the dial 110A is mounted on the dial plate. Dial pointer 112 is mounted on hub pin 142. The dial may be protected from the elements by a mask 170, glass cover 172, gasket 174 and bezel 174. The head unit 100 further includes a base structure 156 which includes a threaded center opening 156A, which is adapted to receive the input stem 126 in a threaded engagement. The base structure 156 may be press fit into an end of the housing 150, in an exemplary embodiment. A nut 158 with lock washer 158A may engage the threads of the input stem to fix the axial location of the bellows at a given location. The base structure 156 includes bores through which threaded bolts 154 pass, to be used to attach the head unit to a mounting location, e.g. within outer housing 162 which may be mounted in a dashboard or other mounting location. The bolts 154 may pass through openings in the outer housing, and be secured with thumbscrews, in an exemplary embodiment. A fitting 160 is threaded onto the end of the input stem 126 of the bellows 120 and includes an adaptor to which the connection tubing system 70 may be attached.

In an exemplary embodiment, the head unit 100 may optionally include a printed circuit board 152 to which are attached LED assemblies 153 for provide dial illumination. A connector may be attached at 156B (FIG. 4).

Figure 1:
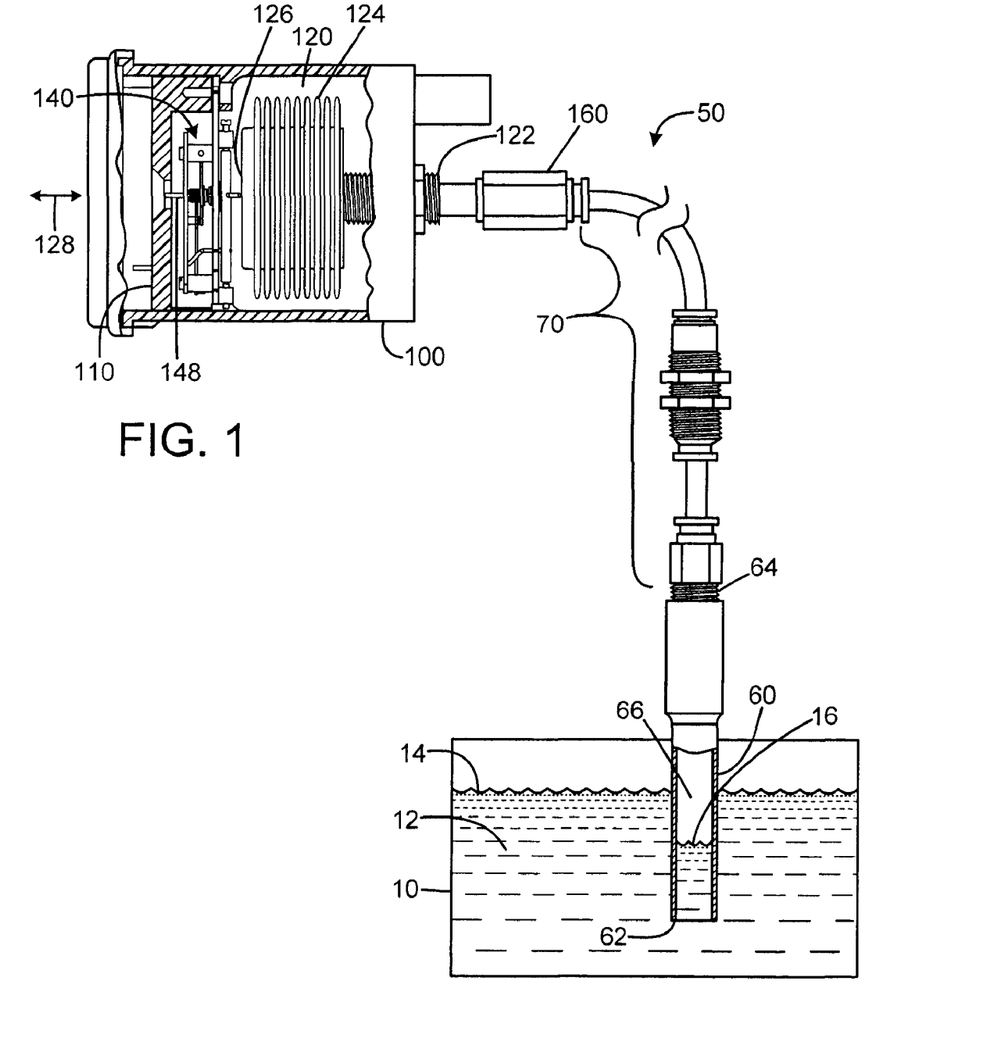
FIG. 1 is a diagrammatic partially broken-away side view illustrating an exemplary embodiment of a liquid level sensor system.
Figure 2:
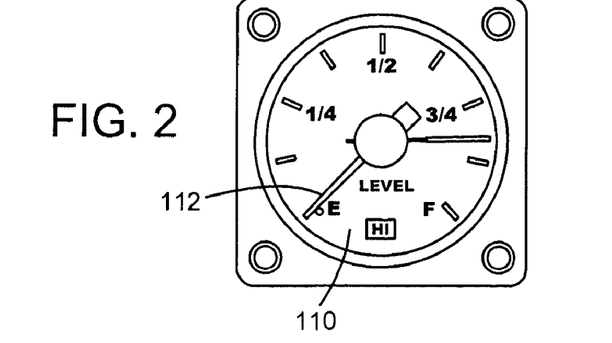
FIG. 2 is a front view of an exemplary embodiment of a display face of an indicator for the system of FIG. 1.
Figures 5, 6:
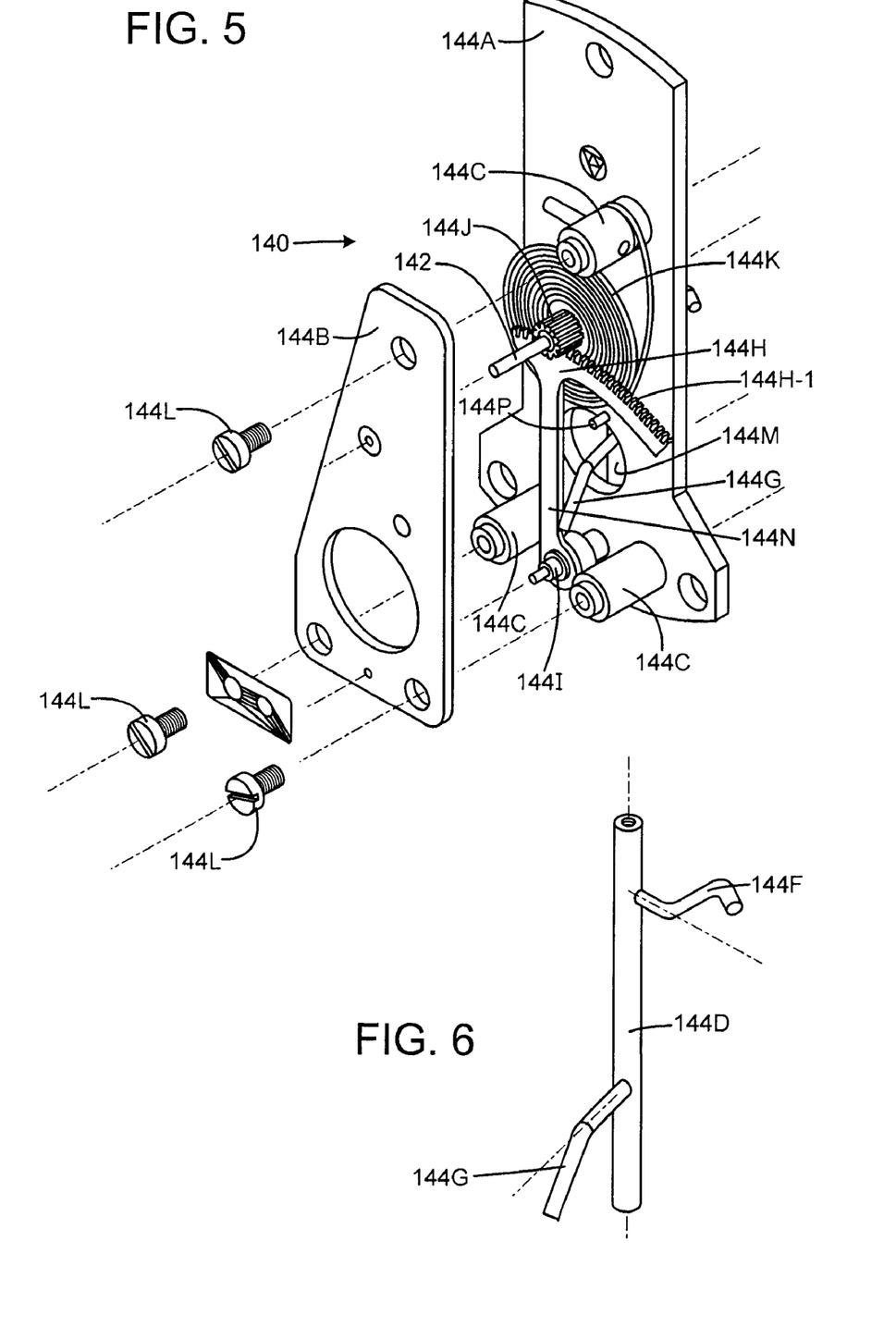
FIG. 5 is an exploded isometric view of an exemplary embodiment of a sector gear movement for the liquid level sensor system of FIG. 1.
FIG. 6 is an isometric view of an exemplary embodiment of an actuating rod included in the sensor head assembly of FIG. 4.

An exemplary embodiment of the sector gear movement 140 is illustrated in FIGS. 1 and 4, and in the exploded view of FIG. 5. The sector gear movement 140 includes a base plate member 144A and a top plate member 144B supported in a spaced relation relative to the base plate by standoff posts 144C. The sector gear movement 140 may be assembled into the housing 150, with the base plate 144A supported on shoulder tabs 152A, 152B protruding from the inner wall 14 of the housing structure. The sector gear movement 140 with the dial plate 110 may be captured in place by the mask 170 and bezel 174 with the head unit in an assembled condition.

The sector gear movement 140 includes a rod 144D mounted on pivots 144E to the back side of the base plate 144A for rotational movement. FIG. 6 illustrates an exemplary embodiment of the rod 144D. The rod 114D has a first lever 144F attached at a generally central location, with a dogleg tip formed therein, and angled toward the bellows face surface 126. The dogleg tip of the lever 144F is adapted to be in contact with the bellows face surface 126 during operation, such that linear motion of the bellows face surface results in rotational movement of the rod 144D. The rod 144D also has a second lever 144G attached at a location offset from the generally central location of the first lever 144F. The second lever 144G may have a dogleg configuration as well, with a tip extending through an opening 144M in the base plate 144A. The tip of the second lever 144G is adapted to contact a web portion 144N of sector gear 144H, causing the sector gear to rotate about pivot mount 144I as rod 144D is rotated.

The exemplary embodiment of the sector gear movement 140 includes a pinion gear 144J mounted on dial pin 142 for rotational movement with the dial pin. Teeth of the pinion gear are in engagement with teeth 144H-1 of the sector gear 144H, such that rotation of the sector gear about its mount 144I results in rotation of pinion gear 144J and dial pin 142. The gear ration between the pinion gear 144J and the sector gear 144H may be selected to provide a desired travel range of movement of the dial pin 142 for a given rotational movement of the sector gear. A bias spring 144K is connected between a stationary post 144C and the pin 142 to bias the pin to a given home position, which may be registered by a pin 144P stopping counterclockwise movement of the sector gear web 144N. The arrangement of the sector gear, the pinion gear, and the levers 144F and 144G may be selected so as to provide a relatively large dial point movement for a relatively small travel distance of the bellows face 126. In one exemplary embodiment, the arrangement may be selected to provide a 270 degree rotation of the dial pin 142 for a range of movement of the bellows face of about 0.050 inch, although this is merely one exemplary embodiment. The travel distance of the face of the bellows may depend on the spring constant of the bellows as well.

An exemplary embodiment of the liquid level sensing system may be calibrated or adjusted to provide accurate sensor readings. One adjustment for the embodiment illustrated in FIGS. 1-6 is the location of the bellows 120 within the housing 150. This location may be varied by turning the bellows so that the stem advances or retracts within the threaded opening 156A. Once the desired location of the bellows face surface 126 has been obtained, the bellows may be locked in position by tightening the locking nut 158 against the lock washer and the base structure 156. Another adjustment may be to bend the pin lever 144F to vary its position relative to the bellows face surface 126. Another adjustment may be to bend the pin lever 144G to vary its position relative to the sector gear web. Bending a pin lever may be done by use of pliers, for example. In an exemplary embodiment, the head may be adjusted so that the dial needle with be at a zero or empty position with a relative column pressure equal to the ambient pressure.

Figure 7:
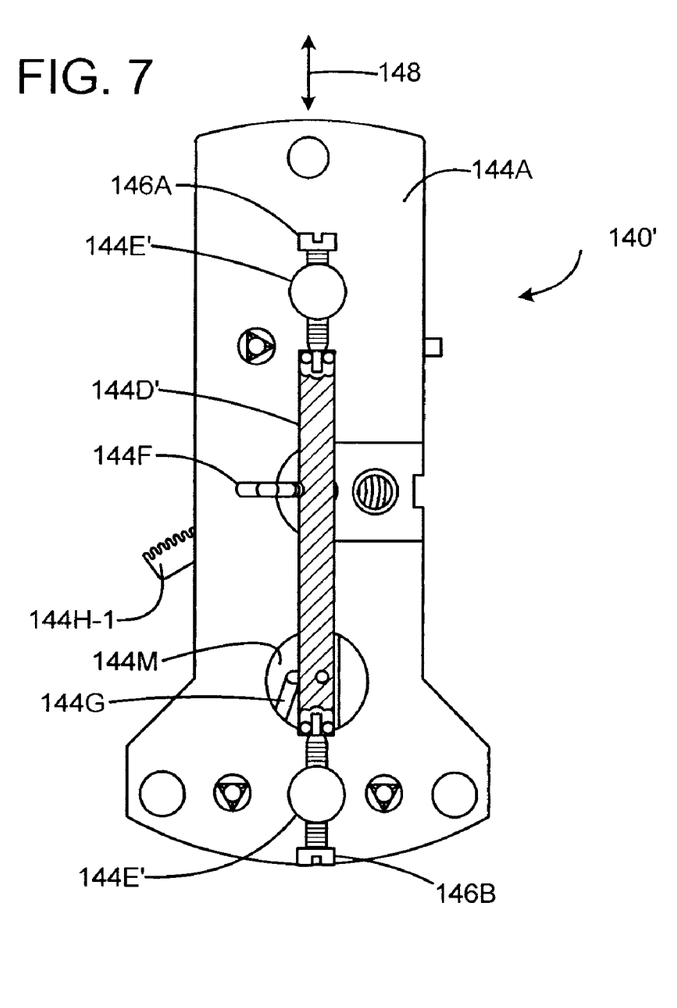
FIG. 7 is a plan view of an alternate embodiment of a sector gear movement.
Figure 8:
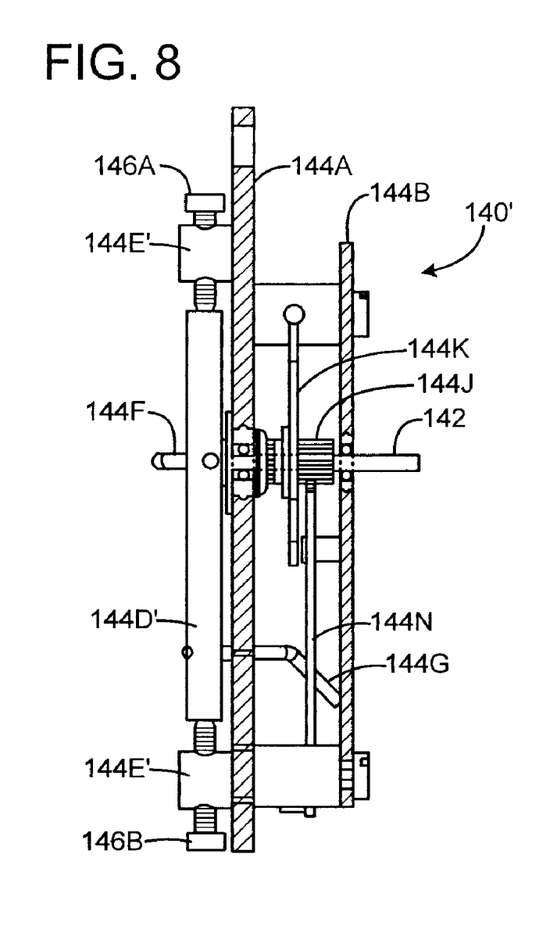
FIG. 8 is a side view of the sector gear movement of FIG. 7.

An alternate embodiment of a sector gear movement 140' is illustrated in FIGS. 7-8. This embodiment is identical to the sector gear movement 140 depicted, e.g., in FIGS. 4-6, except that the rod 140D' is mounted for axial movement, depicted by arrow 148, to provide an adjustment or calibration function. In this exemplary embodiment, the rod is mounted between pivots 144E' by threaded pins 146A, 146B, which have end tips received in bores or openings formed in the opposed ends of the rod 144D'. (This differs from the embodiment depicted in FIGS. 4-6, in which the rod 140D is mounted using one threaded pin on one end and a fixed pin on the other.) By turning the threaded pins 146A, 146B in tandem, the position of the rod 144E1 can be shifted along the direction of arrows 148. By moving the rod, the position of the lever 144G also shifts, and comes into contact with the sector gear web 144N at different positions, with the web 144N disposed at an angle with respect to the rod 144D', thus affecting the position of the sector gear and dial point. This adjustment can be used in calibrating the sensor. The amount of axial adjustment travel may be relatively small, e.g. +/−0.050 inch in an exemplary embodiment, although this will vary in dependence on the parameters of the sector gear movement. This adjustment may be used instead of, or in addition to, bending the lever 144G.

Figure 9:
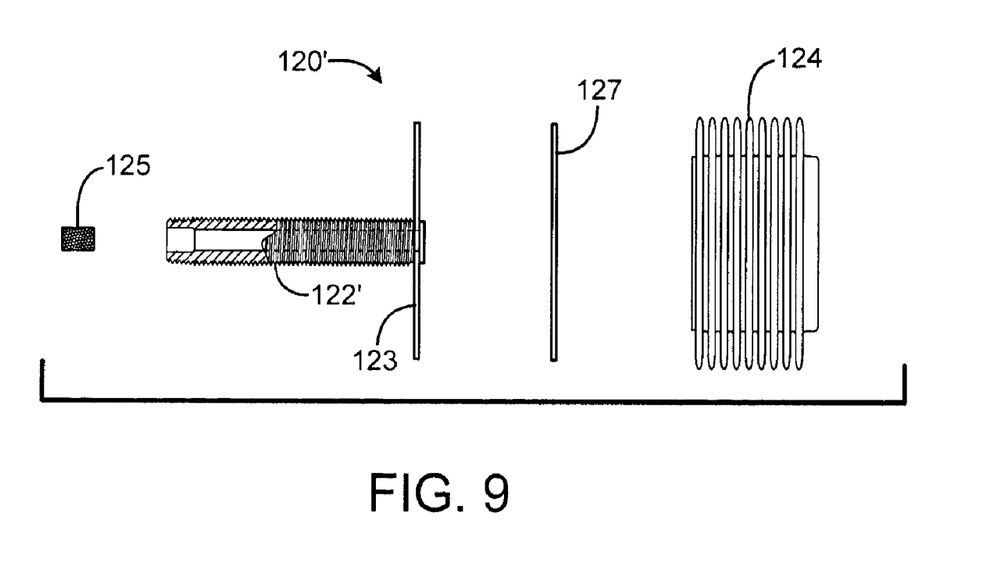
FIG. 9 is an exploded side view of an exemplary alternate embodiment of a bellows assembly for a sensor head assembly.
Figure 10:
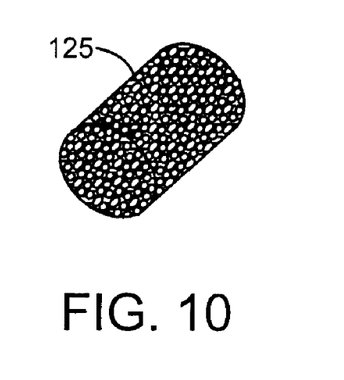
FIG. 10 is an isometric view of a flow restrictor for the bellows assembly of FIG. 9.

Features of an alternate embodiment of a liquid level sensor are depicted in FIGS. 9 and 10. This embodiment is similar to the embodiments of FIGS. 1-8, except that a flow restrictor 125 is introduced in the air column to dampen instantaneous fluctuations in the air column pressure due to vibrations and other sensor noise. This reduces or eliminates rapid movements or quivering of the sensor indicator dial pointer due to such instantaneous fluctuations, while passing steady state column pressure accurately to the bellows 124.

In the exemplary embodiment of FIGS. 9-10, the flow restrictor 125 is positioned inside the hollow input stem 122', which may have an inner diameter of 0.135 inch in an exemplary embodiment. One end of the input stem is attached to an end cap 123, which is in turn attached to the bellows 124 by a solder ring 127 in an exemplary embodiment. The flow restrictor 125 may be positioned in the input stem at its distal end from the bellows, with the inner diameter enlarged over an end region of the input stem. In an exemplary embodiment, the end region may have an inner diameter of 0.152 inch, with a step shoulder defined in the hollow input stem. The flow restrictor 125 may be pressed into the end of the stem, until it reaches the step shoulder.

An exemplary flow restrictor suitable for the purpose is a sintered metal restrictor element, e.g. bronze, having an outer diameter equal to the inner diameter of the input stem 122', and a length on the order of 0.182 inch. An exemplary restrictor element is a rigid structure formed of very small sintered bronzed spheres or balls. In an exemplary embodiment, the spheres may be of a powder grain size. The size of the spheres and density of the restrictor structure may be selected to provide a suitable dampening effect on sudden spikes or decreases in the column pressure, while allowing steady state column pressure to be transmitted through the restrictor to the bellows.

In other embodiments, the flow restrictor may be placed at other locations in the sensor air column, e.g. within the flexible tubing portion of the tube system 70 or in the tube 60 (see FIG. 1).

Figure 11:
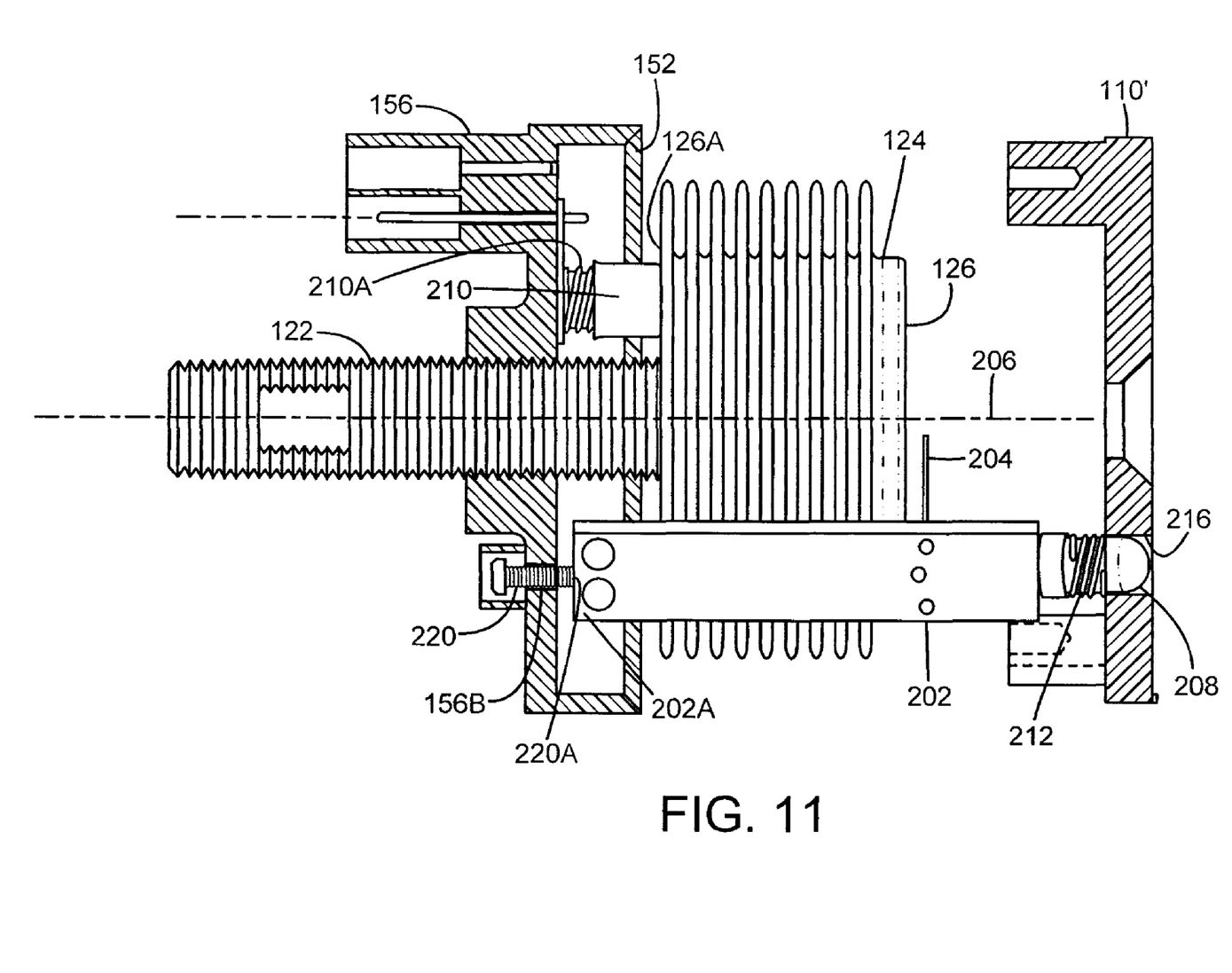
FIGS. 11-12 illustrate features of an alternate embodiment of a sensor head with a low liquid level alarm system.
Figure 12:
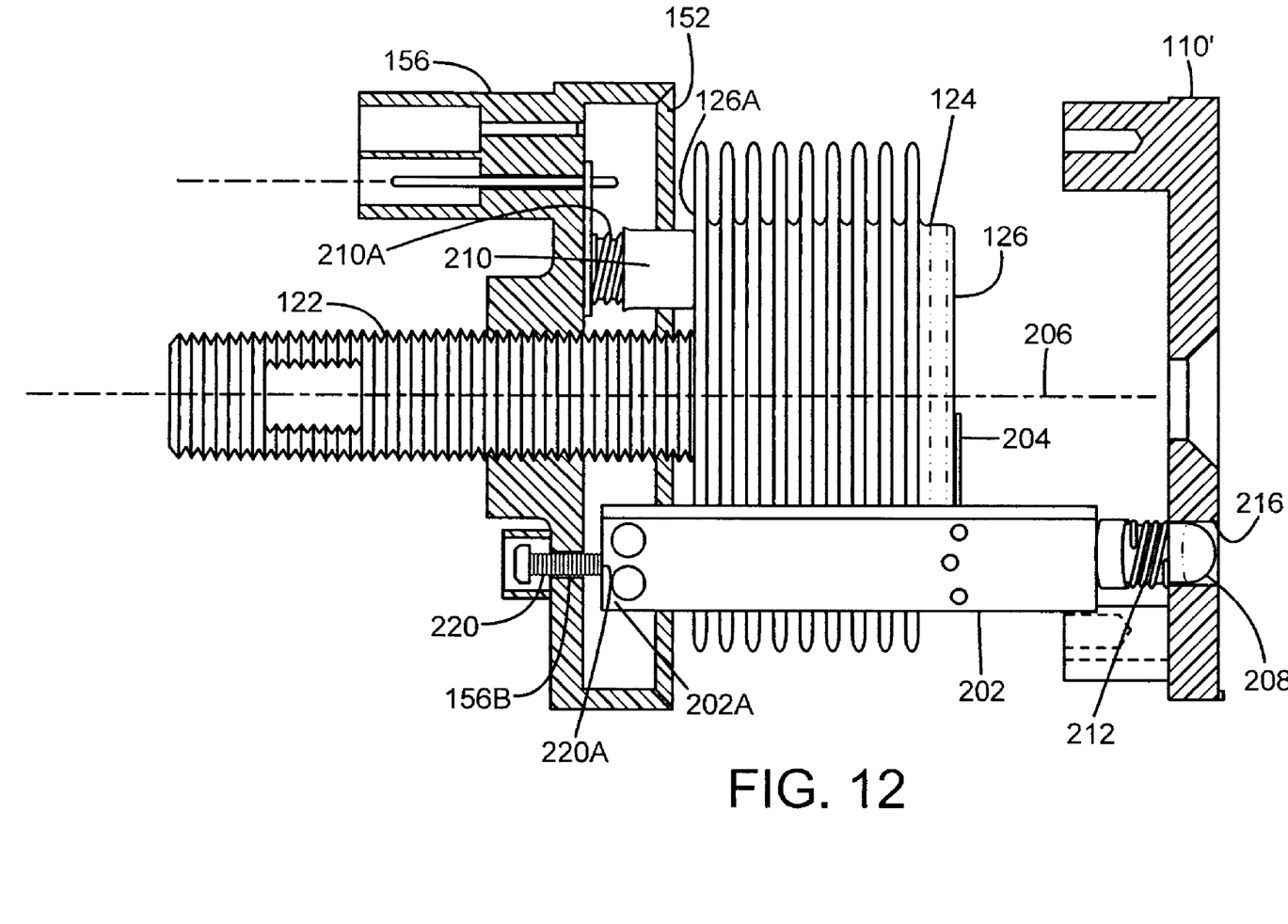

Features of an alternate embodiment of a liquid level sensor are depicted in FIGS. 11-12. This embodiment is similar to the embodiments of FIGS. 1-10, and adds a low liquid level sensor. The low level sensor may provide a signal which is indicative of the state of the liquid level below a desired level or at a low level. In an exemplary embodiment, the signal may cause a warning light to be activated, an audio warning to be generated, or both, or other actions to be activated, such as disabling operation of equipment.

The exemplary embodiment illustrated in FIGS. 10-11 employs the travel of the bellows face surface 126 along the longitudinal axis 206 (FIG. 9) to activate a low liquid level state. The bellows 124 in this example is fabricated of an electrically conductive material. An electrically conductive contact arm 204 is carried by a circuit board riser 202, and is positioned at a threshold location along axis 206 selected to represent the lowest liquid level sensed by the sensor which is considered to be above a low level threshold. The contact arm is a thin metal structure, attached to a support structure, with some flexibility to allow the face to move past the threshold level to accommodate higher liquid level sensing. In an exemplary embodiment, the contact arm may be fabricated of silver-plated brass, although other electrically conductive materials may alternatively be employed. If the liquid level is below the low level threshold, the bellows 124 will withdraw, such that the face surface 126 will be below the contact arm threshold position, and the contact arm will not be in contact with the face surface 126, as depicted in FIG. 11. The contact arm 126 may act as part of a alarm circuit, with a metal boss 210 held in contact with the opposite surface 126A of the bellows. The circuit may provide a small electrical current, e.g. low voltage, DC, which, when the contact arm is in contact with the face surface 126 as depicted in FIG. 12, passes through the boss 210, the bellows 124 and the contact arm 204. However, if the pressure in the bellows is sufficiently low that the face surface is withdrawn along axis 206 below the threshold position, the contact arm no longer is in electrical contact with the bellows face surface, breaking the circuit through which the small electrical current flows. This lack of current flow may be employed by the alarm circuit to cause LED 208 to be activated to show a warning to the operator, and to activate a circuit device such as a relay.

In order to provide a mechanism to adjust or set the low threshold position of the contact arm 204, a set screw 220 is threaded through a threaded opening 156B formed in the base structure 156 so that its end 220A may bear against the adjacent end 202A of the riser structure 202. The riser structure 202 is electrically attached to the printed circuit board assembly 152 by insulated wires (not shown in FIG. 9), which also tend to mechanically support the riser structure. The riser structure fits within a channel in the outer housing structure 150 defined by interior longitudinal spaced ribs (not shown in FIG. 11) in a sliding arrangement. The ribs tend to constrain the lateral position of the riser structure inside the housing structure. A bias spring 212 may be fitted to the LED 208 and arranged to be compressed by the dial plate 110' when the sensor is in an assembled condition. The bias spring 212 tend to exert a bias force against the LED and the riser structure 202, biasing the riser structure against the set screw end 202A. Thus, some adjustment in the longitudinal position of the riser structure, contact arm and the low threshold position may be obtained by turning the set screw and moving the riser end away from the base structure. The LED 208 may be visible through, or protrude into, an opening 216 formed in the dial plate 110'.

Another feature of the alarm circuit is the contact boss 210. Since the bellows position within the housing 150 may be adjusted by turning the input stem 122 to advance or retract the bellows within the housing. So that contact between boss 210 and face 126A is maintained through a range of movement of the input stem and bellows, the boss 210 is mounted on a metal spring or bias member 210A. The boss 210 is movable in a longitudinal sense on the bias member 210A, and the boss rides up and down as the bellows position is advance or retracted, with the bias member pushing the boss against the bellows surface 126A to maintain electrical contact there between. In other embodiments, a contact may be attached to the bellows member or to the input stem, to provide the electrical contact with the bellows member provided by the contact boss 210.

The low liquid level alarm circuit may include a printed wiring conductor formed on or in the riser structure 202, which is electrically connected to the contact arm 204, and a printed wiring conductor formed on or in the printed circuit board assembly 152, and electrically connected to the wiring conductor for the riser structure 202 by an insulated wire running from the base of the riser structure and the circuit board structure 152. Of course, other mounting arrangements may be used as well. Since the printed circuit board 152 is in a fixed position in the housing 150 relative to the bellows, some mounting arrangement which permits adjustment of the low threshold position of the contact arm is preferred.

Figure 13:
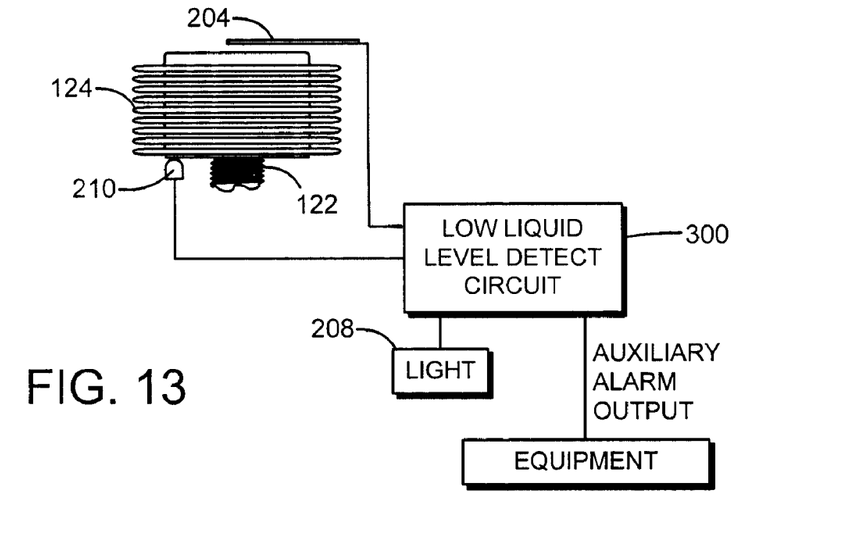
FIG. 13 schematically illustrates connection of an exemplary low liquid level alarm circuit 300 to the contact arm and the contact boss of the sensor head of FIGS. 11-12.

FIG. 13 schematically illustrates connection of an exemplary low liquid level alarm circuit 300 to the contact arm 204 and the contact boss 212. The alarm circuit 300 may take many forms, and in an exemplary embodiment, senses electrical continuity, or the lack of electrical continuity, through the electrically conductive bellows 124 between the boss 212 and the contact arm 212, and generates an alarm activation signal from the continuity status. In the exemplary embodiment described below, the alarm circuit 300 is configured to detect electrical continuity as indicative of a liquid level above the low threshold position, and to generate an alarm signal if electrical continuity does not exist between the contact arm and the contact boss. In the event a low liquid level is detected by the circuit 300, the alarm light 208, e.g. a red LED, is turned on and an auxiliary alarm output is at an active state. Conversely, when the liquid level is above the low threshold position, the alarm light 208 is turned off, and the auxiliary alarm output is at an inactive state.

Figure 14:
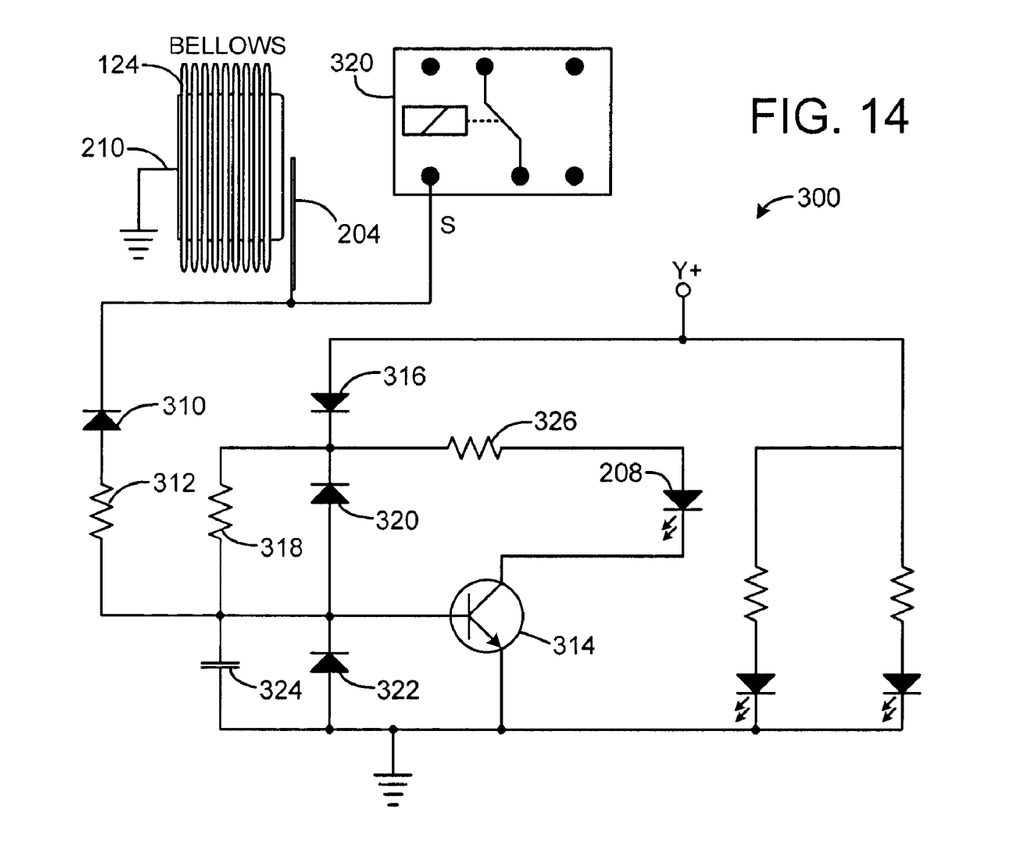
FIG. 14 is a schematic diagram of an exemplary embodiment of a low liquid level alarm circuit.

FIG. 14 is a schematic diagram of an exemplary low liquid level alarm circuit 300. In this exemplary circuit, the contact boss 212 is connected to ground, and if the bellows 124 is expanded sufficiently to make electrical contact with contact arm 204, the contact arm will also be at ground potential. The circuit 300 is connected to a source of electrical power V$^+$, e.g. 12 VDC or 24 VDC. This circuit also provides power for LEDs 153 (FIG. 3) which illuminate the sensor dial in this exemplary embodiment. In this exemplary circuit, the signal "S" is taken as an auxiliary alarm output signal, and is connected to an external relay 320. The relay 320 may be connected to equipment affected by a low liquid level, e.g. a pump operated by hydraulic fluid whose level in a reservoir is being monitored by the sensor circuit, an engine or other equipment. The contact arm 204 is connected to a bias circuit for a transistor switch 314, whose emitter and collector are connected in series with the LED 208 and the power V if contact arm 204 is held at ground potential (as a result of electrical continuity through the bellows 124 to the contact boss 210), then the transistor switch 314 is biased to the non-conductive "off" state through diode 310 and resistor 312. If the contact arm is not grounded, i.e. no signal on the contact arm, then the transistor 314 is turned on by the bias network including diodes 316, 320 and 322, resistor 318 and capacitor 324. Current flows through the collector-emitter junction of transistor 314, resistor 326 and LED 208, activating the LED.

In an exemplary embodiment, the contact arm signal "S" is connected to relay 320, which is configured so when "S" is grounded, the relay is at a first position or state, and when "S" is open, i.e. not grounded, the relay is at a second state. The relay in the second state may be connected, for example, to disconnect or turn off a machine or equipment whose operation is adversely affected by a low liquid level in the reservoir being monitored by the liquid level sensor. For example, if the equipment being monitored is an engine and the reservoir being monitored is an oil reservoir, the alarm circuit 300 may be configured to disable operation of the engine, e.g. by disabling the ignition or fuel pump. Another example is a hydraulic system, in which hydraulic fluid is pumped from a reservoir to operate a hydraulic cylinder or motor. To prevent damage to the hydraulic system which may be caused by operation with low hydraulic level, e.g. to a hydraulic pump which might be damaged, the system may be disabled by the circuit 300. Other exemplary applications include monitoring fuel reservoir levels of unattended engines to shut down the engine before starving the fuel injectors, and monitoring gear box oil levels and shutting off the machinery before damaging the gear box.

Exemplary embodiments of a liquid level sensor may be used, for example, to monitor lubricating oil levels in engine crankcases or oil sumps, fuel levels in fuel tanks of vehicles such as cars, trucks and aircraft, as well as fuel levels in marine applications such as ships and boats. In an exemplary embodiment, the sensor system is actuated by column pressure in the tube, and is not electrically actuated. In an exemplary embodiment, the particulars of the bellows and the sector gear movement used for a given application may be selected based on the parameters of the application, such as the type of liquid whose level is being sensed, the capacity of the liquid reservoir, the difference in the empty level and a full level in the reservoir, and the like. By way of example, the difference in an empty level and a full level for an engine crankcase in a truck engine may be on the order of 5 to 6 inches for one type of engine. The stiffness of the bellows and the gear ratio of the sector gear may be selected to provide a range of movement of the dial pointer between an empty indication and a full indication for a difference in column pressure caused by the 5 to 6 inch differential height of the liquid level in the reservoir. The same sector gear movement may be used for several different applications, with different bellows being selected to accommodate variations in the particular application. Other applications, such as a vehicle fuel tank sensor or a service station tank, may have larger or smaller differential levels between an empty and a full level, and the liquid level sensor components may be selected to provide an accurate level indication for such applications as well.

Although the foregoing has been a description and illustration of specific embodiments of the invention, various modifications and changes thereto can be made by persons skilled in the art without departing from the scope and spirit of the invention as defined by the following claims.

What is claimed is:

1. A liquid level sensor, comprising:
 a hollow member having a distal open end adapted to be positioned into a liquid reservoir to a depth below a liquid surface level, the distal open end of the hollow member allowing liquid to enter the hollow member to an equilibrium level dependent on the volume of liquid in the liquid reservoir;
 a sensor head unit configured for mounting at a head mount location remote from the liquid reservoir;
 a connection tubing system adapted to provide a closed connection between the hollow member and the sensor head unit, such that a column pressure in said hollow member dependent on said equilibrium level is transmitted to the sensor head unit;
 said sensor head unit comprising:
  a bellows member having an input stem portion adapted for connection to the connection tubing system, an expandable body portion and a distal bellows face surface, the bellows body adapted for expansion and contraction in response to differential column pressure changes so that said bellows face surface translates along a range of movement, the bellows member mounted in a sensor head housing with external surfaces of the bellows member exposed to ambient atmospheric pressure;
  a non-electrically-powered mechanism responsive to movement of said bellows face surface to provide an indication of said liquid surface level at each liquid level within a range of liquid levels from a full or high liquid level and a lower liquid level; and a low liquid level alarm circuit responsive to the bellows member to generate an electrical signal indicative of a low liquid level state.

2. The sensor of claim 1, wherein the low liquid level alarm circuit is responsive to the distal bellows face surface withdrawing below a threshold position to generate said signal.

3. The sensor of claim 1, wherein the low liquid level alarm circuit includes a contact arm supported at a location within said range of movement corresponding to threshold position.

4. The sensor of claim 3, wherein said bellows member is fabricated of an electrically conductive material, and said low level alarm circuit is configured to sense the presence or absence of electrical continuity between said contact arm and said bellows member.

5. The sensor of claim 3, wherein said sensor head unit comprises:
a housing structure, the bellow member supported within the housing unit;
a adjustment mechanism for adjusting the position of the bellow member relative to said non-electrically-powered mechanism, wherein a home position of the bellows face surface may be adjusted by said adjustment mechanism; and
wherein the low liquid level alarm circuit includes a support structure for said contact arm and an adjusting mechanism for adjusting the position of said contact arm within said range of movement to adjust said threshold position.

6. The sensor of claim 5, wherein said support structure includes a dielectric riser structure attached to the contact arm and configured for sliding movement in said housing structure, and a movable member arranged to contact the riser structure to set a position of the contact arm within the range of movement.

7. The sensor of claim 6, wherein the adjusting mechanism further includes a bias member for exerting a bias force on the riser structure in opposition to a force exerted by the movable member.

8. The sensor of claim 4, wherein the alarm circuit includes a contact boss member for making electrical contact with the bellows member to provide a circuit contact such that said electrical continuity is through said contact boss, said bellows member and said contact arm.

9. The sensor of claim 8, wherein said contact boss is mounted for movement along an axis, and is urged into physical contact with the bellows by a bias support structure.

10. The sensor of claim 1, wherein said hollow member is a rigid tube, and said distal end is adapted to be positioned at a depth in the reservoir below a low or empty liquid level.

11. The sensor of claim 1, further including a warning light, said signal activating the warning light to provide an indication of a low liquid level condition.

12. The sensor of claim 1, wherein the non-electrically-powered mechanism converts a linear movement of the bellows face surface into a rotary movement, said mechanism including a sector gear movement including a dial pin, a pinion gear mounted to said dial pin, and a sector gear responsive to said movement of said bellows face surface, said sector gear engaging said pinion gear to rotate said pinion gear and said dial pin in response to said movement of said bellows face surface.

13. The sensor of claim 12, wherein the non-electrically powered mechanism further comprises:

a rotatable shaft mounted for rotation adjacent and in parallel to said bellows face surface, a first lever extending from said rotatable shaft and positioned in contact with the bellows face surface so that movement of the bellows face surface causes motion of the first lever to rotate the rotatable shaft, and a second lever extending from said rotatable shaft and positioned to contact a sector gear member and rotate the sector gear as the rotatable shaft is rotated.

14. The sensor of claim 1, further comprising a disable circuit activated by said alarm circuit to disable operation of a machine using the liquid in the reservoir.

15. A liquid level sensor, comprising:
a hollow member having a distal open end adapted to be positioned into a liquid reservoir to a depth below a liquid surface level, the distal open end of the hollow member allowing liquid to enter the hollow member to an equilibrium level dependent on the volume of liquid in the liquid reservoir;
a sensor head unit configured for mounting at a head mount location remote from the liquid reservoir;
a connection tubing system adapted to provide a closed connection between the hollow member and the sensor head unit, such that a column pressure in said hollow member dependent on said equilibrium level is transmitted to the sensor head unit;
said sensor head unit comprising:
a bellows member having an input stem portion adapted for connection to the connection tubing system, an expandable body portion and a distal bellows face surface, the bellows body adapted for expansion and contraction in response to differential column pressure changes so that said bellows face surface translates along a range of movement, the bellows member fabricated of an electrically conductive material;
a non-electrically-powered mechanism responsive to movement of said bellows face surface to provide an indication of said liquid surface level at each liquid level within a range of liquid levels from a full or high liquid level and a lower liquid level; and
a low liquid level alarm circuit responsive to travel of the bellows face surface along the range of movement to activate a low liquid level state alarm signal.

16. The sensor of claim 15, wherein the low liquid level alarm circuit is responsive to the distal bellows face surface withdrawing below a threshold position to generate said signal.

17. The sensor of claim 16, wherein the low liquid level alarm circuit includes an electrically conductive contact arm supported at a location within said range of movement corresponding to said threshold position.

18. The sensor of claim 17, wherein said low level alarm circuit is configured to sense the presence or absence of electrical continuity between said contact arm and said bellows member.

19. The sensor of claim 17, wherein said sensor head unit comprises:
a housing structure, the bellow member supported within the housing unit;
a adjustment mechanism for adjusting the position of the bellow member relative to said non-electrically-powered mechanism, wherein a position of the bellows face surface may be adjusted by said adjustment mechanism; and
wherein the low liquid level alarm circuit includes a support structure for said contact arm and an adjusting mechanism for adjusting the position of said contact arm within said range of movement to adjust said threshold position.

20. The sensor of claim 18, wherein the alarm circuit includes a contact boss member for making electrical contact with the bellows member to provide a circuit contact such that said electrical continuity is through said contact boss, said bellows member and said contact arm.

21. The sensor of claim 15, further including a warning light, said alarm signal activating the warning light to provide an indication of a low liquid level condition.

22. The sensor of claim 15, further comprising a relay activated by said alarm circuit to disable operation of a machine using the liquid in the reservoir.

* * * * *